(12) United States Patent
Villero et al.

(10) Patent No.: US 11,995,585 B2
(45) Date of Patent: May 28, 2024

(54) SYSTEMS AND METHODS FOR IDENTIFYING MACHINE MODIFICATIONS FOR IMPROVED PRODUCTIVITY

(71) Applicant: Caterpillar Inc., Peoria, IL (US)

(72) Inventors: David A. Villero, Peoria, IL (US); Kyle J. Cline, Savoy, IL (US)

(73) Assignee: Caterpillar Inc., Peoria, IL (US)

( * ) Notice: Subject to any disclaimer, the term of this patent is extended or adjusted under 35 U.S.C. 154(b) by 129 days.

(21) Appl. No.: 17/390,442

(22) Filed: Jul. 30, 2021

(65) Prior Publication Data

US 2023/0033876 A1 Feb. 2, 2023

(51) Int. Cl.
  *G06Q 10/0631* (2023.01)
  *G06N 5/04* (2023.01)
  *G06Q 50/08* (2012.01)

(52) U.S. Cl.
  CPC ......... *G06Q 10/06312* (2013.01); *G06N 5/04* (2013.01); *G06Q 50/08* (2013.01)

(58) Field of Classification Search
  CPC ..... G06Q 10/06312; G06Q 50/08; G06N 5/04
  USPC .......................................... 705/7.22
  See application file for complete search history.

(56) References Cited

U.S. PATENT DOCUMENTS

| | | | | |
|---|---|---|---|---|
| 6,831,663 B2 * | 12/2004 | Chickering | ............ | G06Q 10/02 707/999.102 |
| 7,171,344 B2 | 1/2007 | Lind | | |
| 9,797,247 B1 * | 10/2017 | Nelson | .................... | G05D 1/024 |
| 2007/0255502 A1 * | 11/2007 | Pruett | .................... | G06Q 50/02 702/19 |
| 2009/0099886 A1 * | 4/2009 | Greiner | .................. | G06Q 50/30 705/7.38 |
| 2012/0191531 A1 * | 7/2012 | You | ........................ | G06F 16/958 705/14.42 |
| 2016/0353185 A1 * | 12/2016 | Krishnan | ................. | H04Q 9/00 |
| 2017/0097881 A1 * | 4/2017 | Hodel | ................. | G06F 11/3672 |
| 2017/0284072 A1 | 10/2017 | Jensen | | |
| 2018/0005461 A1 * | 1/2018 | Steketee | .................... | E02F 3/96 |
| 2019/0324444 A1 * | 10/2019 | Cella | .................. | G05B 19/4183 |

OTHER PUBLICATIONS

Hong-Chul Lee, et al., Eco-economic excavator configuration method. Automation in Construction. vol. 86, 2018, pp. 138-149.*

(Continued)

*Primary Examiner* — Timothy Padot (57) ABSTRACT

A method for identifying machine modifications to improve machine productivity can include receiving telematics data from a plurality of sensors on a machine performing an activity. An activity type can be determined based on the telematics data. The method can also include calculating a current estimated machine productivity for the activity type and calculating a predicted machine productivity for the activity type for each of a plurality of machine modifications. The predicted machine productivity for each of the plurality of machine modifications can be compared with the current estimated productivity. The method can include calculating an investment metric for each of the machine modifications having a predicted machine productivity greater than the current estimated productivity. Each investment metric and its corresponding machine modification can be output for review by a user.

22 Claims, 8 Drawing Sheets

(56) References Cited

OTHER PUBLICATIONS

Equipment Selection is Key for Productivity in Underground Loading and Haulage. Carter, Russell A. Engineering and Mining Journal 215.6: 46-48,50,52. Mining Media International. (Jun. 2014).*
Getting attached: maximize equipment productivity with the proper attachments. Amerman, Doug. Landscape & Irrigation36.1: 20(2). Bev-AL Communications, Inc. (Jan. 2012).*
Agriculture equipment innovations make farming more profitable. Postmedia Network Inc. (2018).*
Lee Hong-Chul et al: "Eco-economic excavator configuration method", Automation in Construction, Elsevier, Amsterdam, NL, vol. 86, Nov. 15, 2017 (Nov. 15, 2017), pp. 138-149, XP085300861, ISSN: 0926-5805, DOI: 10.1016/J.AUTCON.2017.11.006—Abstract only.
Written Opinion and International Search Report for Int'l. Patent Appln. No. PCT/US2022/036160, dated Oct. 25, 2022 (9 pgs).

* cited by examiner

Technology feature matching guide

700

| | | Included | Optional | Truck Loading | Digging Trench | Digging hole | Backfilling | Grading / Leveling | Lifting / pipe laying | Hydro-mechanical work tool |
|---|---|---|---|---|---|---|---|---|---|---|
| E-FENCE | E-Fence (Ceiling) | ✓ | | ∗∗ | ∗∗ | ∗∗ | ∗∗ | ∗∗ | ∗∗ | ∗∗ |
| | E-Fence (Wall) | ✓ | | ∗∗ | ∗∗ | ∗∗ | ∗∗ | ∗∗ | ∗∗ | ∗∗ |
| | E-Fence (Floor) | ✓ | | ∗∗ | ∗∗ | ∗∗ | ∗∗ | ∗∗ | ∗∗ | ∗∗ |
| | E-Fence (Swing) | ✓ | | ∗∗ | ∗∗ | ∗∗ | ∗∗ | ∗∗ | ∗∗ | ∗∗ |
| | Cab Avoidance | ✓ | | ∗∗ | ∗∗ | ∗∗ | ∗∗ | ∗∗ | ∗∗ | ∗∗ |
| CAT GRADE | Cat Grade w/ 2D | ✓ | | | ∗ | ∗ | | ∗ | | |
| | Cat Grade w/ Advanced 2D | | ✓ | | ∗ | ∗ | | ∗ | | |
| | Cat Grade w/ 3D | | ✓ | | ∗ | ∗ | | ∗ | | |
| ASSIST | Grade W/Assist | ✓ | | ∗ | ∗ | ∗ | | ∗ | | |
| | Bucket Assist | ✓ | | ∗ | ∗ | ∗ | | ∗ | | |
| | Boom Assist | ✓ | | | | | ∗ | | | |
| | Swing Assist | ✓ | | | | | ∗ | | | |
| PAYLOAD | Caterpillar Production Measurement | | ✓ | | | ∗ | | | | |
| | Assist weigh | | ✓ | | | | | | ∗ | ∗ |

(∗∗) *Primary driven by job size and machine configuration*
(∗) *Primary driven by application*

*FIG. 7*

GENERAL PURPOSE                                                                 800

- Good all around performance for stockpiling, re-handling, excavating and bank loading.
- Intended for use in low-impact materials.

MATERIAL HANDLING

- For stockpile loading loose materials such as gravel, sand and dirt in load-and-carry applications.
- Intended for use in low-impact materials.
- These are the best performers for production loading.
- Flat bottom bucket.

ROCK BUCKETS

- For use in applications such as face loading limestone and other unprocessed rock. Also used in truck and hopper loading for a wide range of quarry materials.
- Intended for use in moderate- to high-abrasion applications.
- Balances the need for high production in more abrasive applications.

HEAVY DUTY QUARRY ROCK BUCKET

- For use where maximum abrasion resistance is required
- Intended for use in high-abrasion, high-impact applications.

*FIG. 8*

SYSTEMS AND METHODS FOR IDENTIFYING MACHINE MODIFICATIONS FOR IMPROVED PRODUCTIVITY

TECHNICAL FIELD

This patent application is directed to improving machine productivity, and more specifically, to identifying and evaluating machine modifications for improved productivity.

BACKGROUND

Machines, such as excavators, can perform more than one task or application. For each of those applications, a machine's productivity can be improved by taking advantage of different features of the machines, such as different modes and/or autonomous features. In many cases, productivity can also be improved by replacing an existing attachment with a different attachment or implement that is better suited to the application being performed by the machine. However, it is difficult to predict what type of features and attachments would benefit a particular machine at the time of purchase and as the machine is deployed to perform various applications over time.

Efforts have been made to improve productivity of machines operating in a worksite. For example, U.S. Patent Application Publication No. 2017/0284072 to Jensen, (hereinafter "Jensen") describes a project management system to improve the productivity of one or more machines for a worksite. The system collects data from a machine and classifies the operation of the machine based on a duty cycle of the machine as compared to a maximum load capacity. For example, the system may classify the operation as light, medium, or heavy duty. Based on this classification, the system recommends using a different machine with higher capacity or upgrading the hydraulic system, for example, to heavier duty system. Jensen relies on input to know what type of application the machine is performing. Thus, Jensen does not make specific recommendations for attachments and machine features based on the application being performed and is limited to recommendations based on duty cycle.

Thus, there is still a need to determine what type of features and attachments would benefit a particular machine performing a specific application during actual use. The example systems and methods described herein are directed toward overcoming one or more of the deficiencies described above and/or other problems with the prior art.

SUMMARY

In some embodiments, a method for identifying machine modifications to improve machine productivity can include receiving telematics data from a plurality of sensors on a machine performing an activity. An activity type can be determined based on the telematics data. The method can also include calculating a current estimated machine productivity for the activity type and calculating a predicted machine productivity for the activity type for each of a plurality of machine modifications. The predicted machine productivity for each of the plurality of machine modifications can be compared with the current estimated productivity. The method can include calculating an investment metric for each of the machine modifications having a predicted machine productivity greater than the current estimated productivity. Each investment metric and its corresponding machine modification can be output for review by a user.

According to some aspects, calculating the current estimated machine productivity for the activity type is based at least in part on a payload inference model. In some aspects, the plurality of machine modifications include changing an attachment and activating autonomous features. In other aspects, calculating the predicted machine productivity for each of the plurality of machine modifications is based on a physics based model. In some further aspects, each investment metric and its corresponding machine modification are displayed on a mobile device. In some aspects, calculating the investment metric comprises calculating at least one of a payback period or a return on investment.

In some embodiments, a system for identifying machine modifications to improve machine productivity can include one or more processors and one or more memory devices having instructions stored thereon. When executed, the instructions cause the one or more processors to receive telematics data from a plurality of sensors on a machine performing an activity. An activity type can be determined based on the telematics data. The instructions can also cause the one or more processors to calculate a current estimated machine productivity for the activity type and calculate a predicted machine productivity for the activity type for each of a plurality of machine modifications. The predicted machine productivity for each of the plurality of machine modifications can be compared with the current estimated productivity. The instructions can include calculating an investment metric for each of the machine modifications having a predicted machine productivity greater than the current estimated productivity. Each investment metric and its corresponding machine modification can be output for review by a user.

In some aspects, the system can further comprise the plurality of sensors on the machine. According to some aspects, the telematics data from the plurality of sensors is received via a satellite network.

In some embodiments, one or more non-transitory computer-readable media storing computer-executable instructions that, when executed by one or more processors, cause the one or more processors to perform operations. The operations can include receiving telematics data from a plurality of sensors on a machine performing an activity. An activity type can be determined based on the telematics data. The operations can also include calculating a current estimated machine productivity for the activity type and calculating a predicted machine productivity for the activity type for each of a plurality of machine modifications. The predicted machine productivity for each of the plurality of machine modifications can be compared with the current estimated productivity. The operations can include calculating an investment metric for each of the machine modifications having a predicted machine productivity greater than the current estimated productivity. Each investment metric and its corresponding machine modification can be output for review by a user.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for identifying machine modifications for improved productivity. Machines, such as excavators, can perform more than one task or application e.g., mass excavation, dirt moving, trenching, scraping, grading, loading, and/or tracking. For each of those applications, a machine's productivity can be improved by taking advantage of different features of the machines, such as different modes and/or autonomous features. In some embodiments, these autonomous features can include E-fence (ceiling, wall, floor, swing), E-Cab, Cat Grade (2D, Advance 2D, 3D), Assist (Grade, Bucket, Boom, Swing) and Cat Payload (see FIG. 7). Productivity can also be improved by replacing an existing attachment with a different attachment or implement that is better suited to the application being performed by the machine. For example, there is an optimal wheel loader bucket for a particular range of material densities. Thus, in some applications it may improve productivity, for example, to replace a general purpose bucket with a rock bucket when a machine loading limestone or other unprocessed rock (see FIG. 8). However, it is difficult to predict what type of features and attachments would benefit a particular machine at the time of purchase and as the machine is deployed to perform various applications over time.

The disclosed technology addresses this issue by determining what type of features and/or attachments would benefit a particular machine performing a specific application during actual use. The system uses machine sensors (e.g., telematics data) and productivity data as inputs, along with productivity models, such as payload inference models, to determine an application and estimate a current machine productivity for that application. Physics-based models can be used to iterate the performance and productivity of the machine with different attachments and autonomous features enabled, thereby generating a machine modification (i.e., attachment or feature change) recommendation. In addition, the system can compare a current estimated machine productivity with a predicted machine productivity associated with a recommended modification. Based on this comparison the system can provide one or more metrics to inform decisions as to which modifications to implement based on an economic perspective (e.g., payback period and/or a return on investment). In some implementations, the recommended machine modification(s) and their corresponding metrics can be output for review by a user with a web/mobile application, for example.

Figure 1:
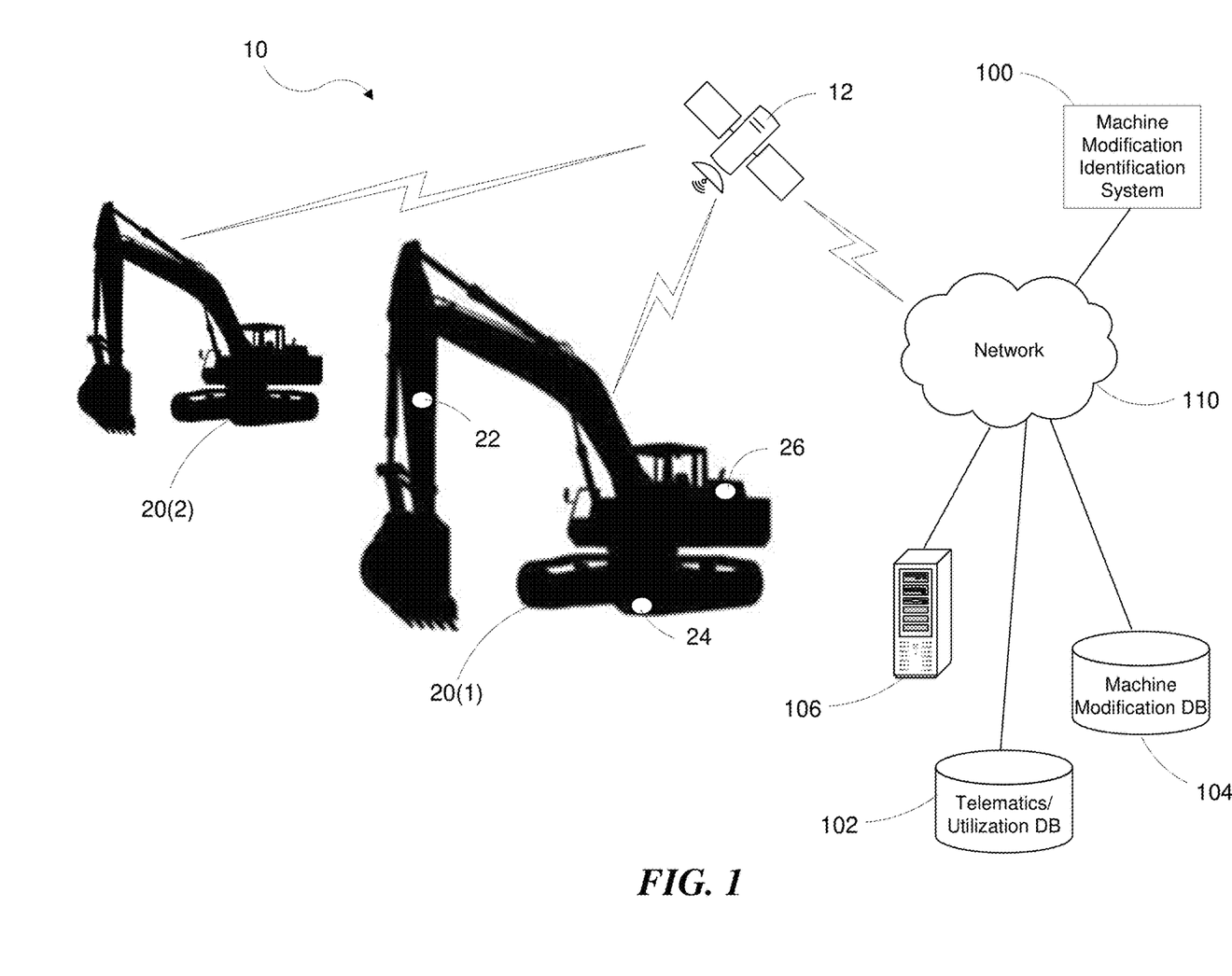
FIG. 1 is a diagram illustrating an overview of an environment in which some implementations can operate according to embodiments of the disclosed technology.

FIG. 1 illustrates an environment 10 in which some implementations of the machine modification identification system 100 can operate according to embodiments of the disclosed technology. The system environment 10 can include multiple machines, such as excavators 20(1) and 20(2), a satellite 12, telematics/utilization database 102, a machine modification database 104, a telematics processing system 106, and a network 110. The machine modification identification system 100 can be connected to the telematics/utilization database 102, the machine modification database 104, and the telematics processing system 106 via network 110. The telematics/utilization database 102 and the telematics processing system 106 can receive telematics data from the excavators 20(1) and 20(2) via satellite 12. The telematics data can include sensor data from the excavators, such as from a pressure sensor 22, a vibration sensor 24, and a temperature sensor 26, to name a few.

In some embodiments, the telematics processing system 106 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including 50% mass excavation, 20% grading, and 30% tracking (i.e., traveling from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, trenching, scraping, grading, loading, tracking, or idle time. Models may supplement standard telematics data with additional sensors to measure the intensity of use. The resulting machine utilization patterns, or activity data, can be provided to the machine modification identification system 100 to identify machine modifications that would improve a machine's productivity for an identified application.

Figure 2:
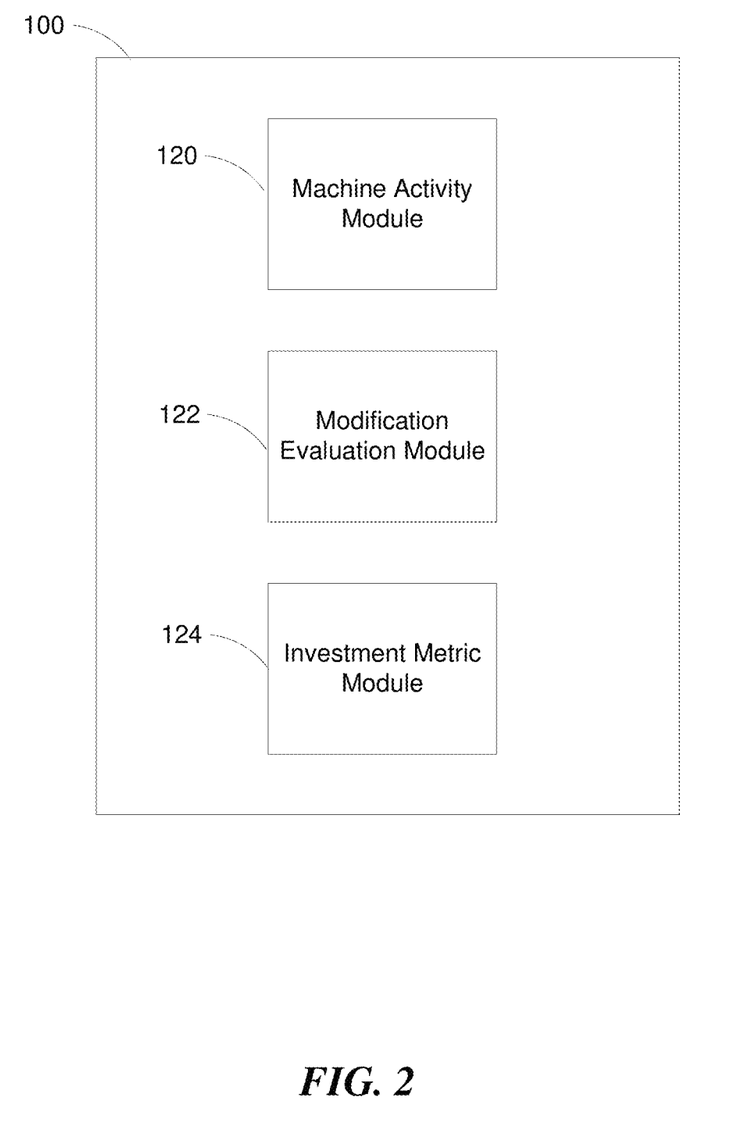
FIG. 2 is a block diagram illustrating an overview of a machine modification identification system according to some embodiments of the disclosed technology.

As shown in FIG. 2, the machine modification identification system 100 can comprise a machine activity module 120, a modification evaluation module 122, and an investment metric module 124. The machine activity module 120 can gather machine sensor and productivity data and leverage application classification models to segment machine activity along with productivity models, such as payload inference models, to estimate machine productivity by application. The modification evaluation module 122 can use physics-based models to iterate the performance and productivity of the machine with different attachments and autonomous features. The investment metric module 124 can compare actual productivity with the estimated productivity from virtual simulations and suggest an attachment and/or feature enhancement for a long-term tradeoff as well as suggestive performance improvements.

Figure 3:
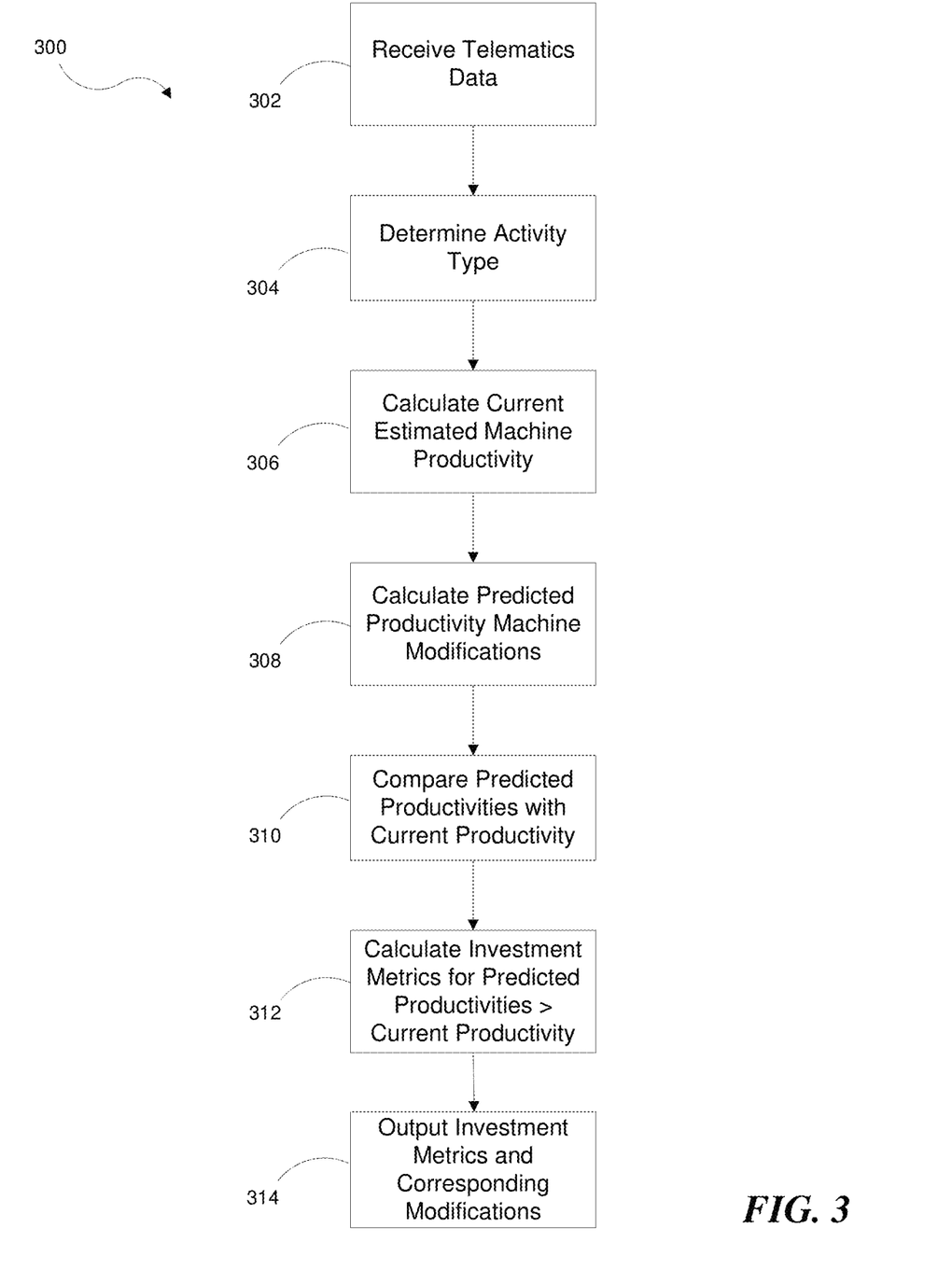
FIG. 3 is a flow diagram showing a method for identifying machine modifications for improved productivity according to some embodiments of the disclosed technology.

FIG. 3 is a flow diagram showing a method 300 for identifying machine modifications for improved productivity according to some embodiments of the disclosed technology. The method 300 can include receiving, at step 302, telematics data from a plurality of sensors 22, 24, and 26 on a machine 20(1) performing an activity. An activity type can be determined based on the telematics data at step 304.

The method 300 can also include calculating a current estimated machine productivity for the activity type at step 306 and calculating a predicted machine productivity for the activity type for each of a plurality of machine modifications at step 308. In some embodiments, calculating the current estimated machine productivity for the activity type is based at least in part on a payload inference model. In some embodiments, the plurality of machine modifications include changing an attachment and activating autonomous features. In some embodiments, calculating the predicted machine productivity for each of the plurality of machine modifications is based on a physics based model.

An example for calculating the current estimated machine productivity can include multiplying the number of yards of dirt a current bucket can carry by the number of cycles per hour the machine is currently performing, thereby deriving yards per hour. The predicted machine productivity can include performing the same calculation with a larger bucket, for example. The difference in yards per hour between the current and predicted productivities can be translated into dollar savings (e.g., fuel cost savings).

The predicted machine productivity for each of the plurality of machine modifications can be compared with the current estimated productivity at step 310. The method 300 can include calculating an investment metric for each of the machine modifications having a predicted machine productivity greater than the current estimated productivity at step 312. In some embodiments, calculating the investment metric comprises calculating at least one of a payback period or a return on investment.

Each investment metric and its corresponding machine modification can be output for review by a user at step 314. In some embodiments, each investment metric and its corresponding machine modification are displayed on a mobile device. The recommended machine modifications can be ranked by payback period, return on investment, cost to implement, dollar savings over time, and/or any other suitable investment metric.

Figure 7:
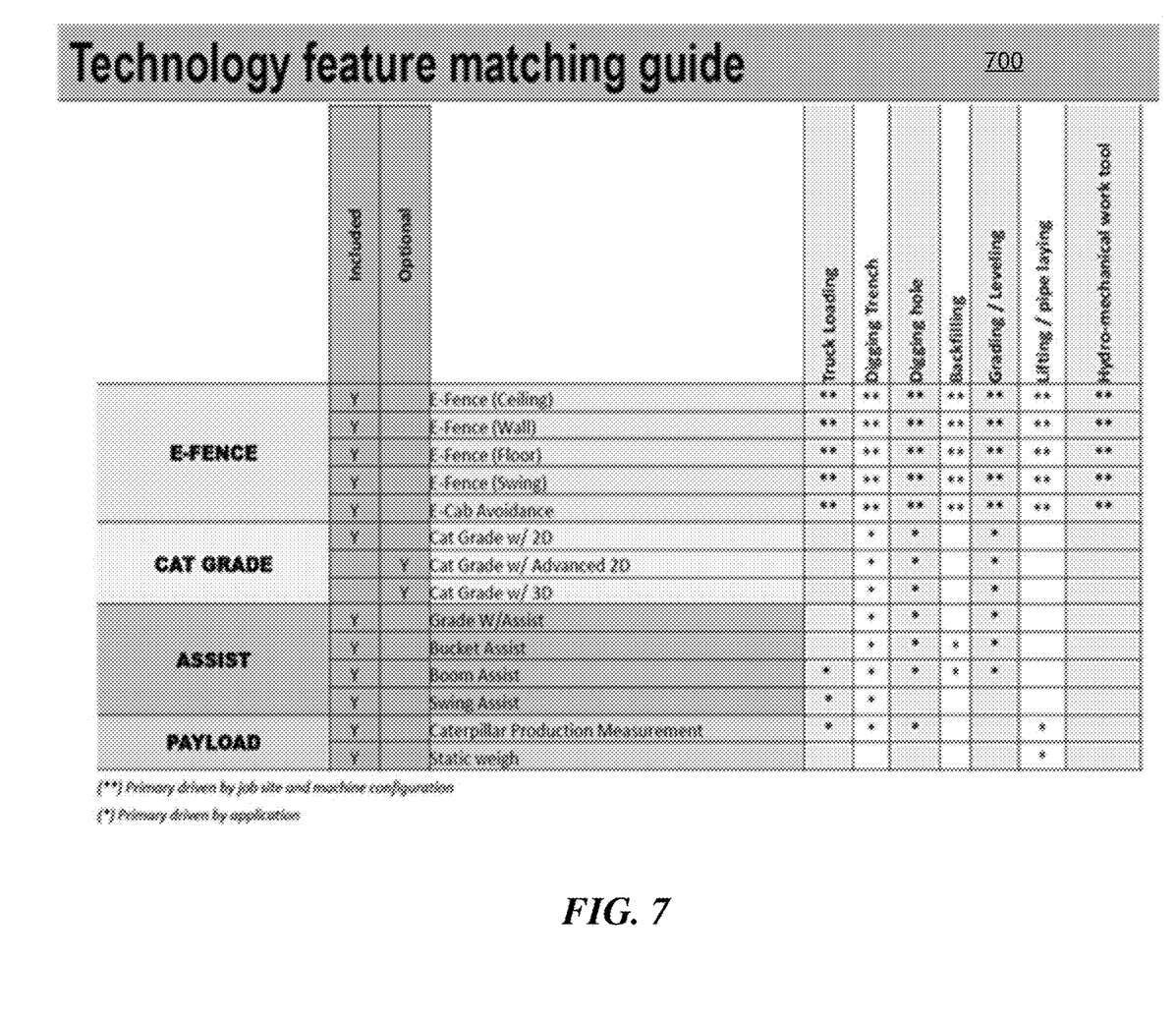
FIG. 7 is a technology features matching guide according to embodiments of the disclosed technology.
Figure 8:
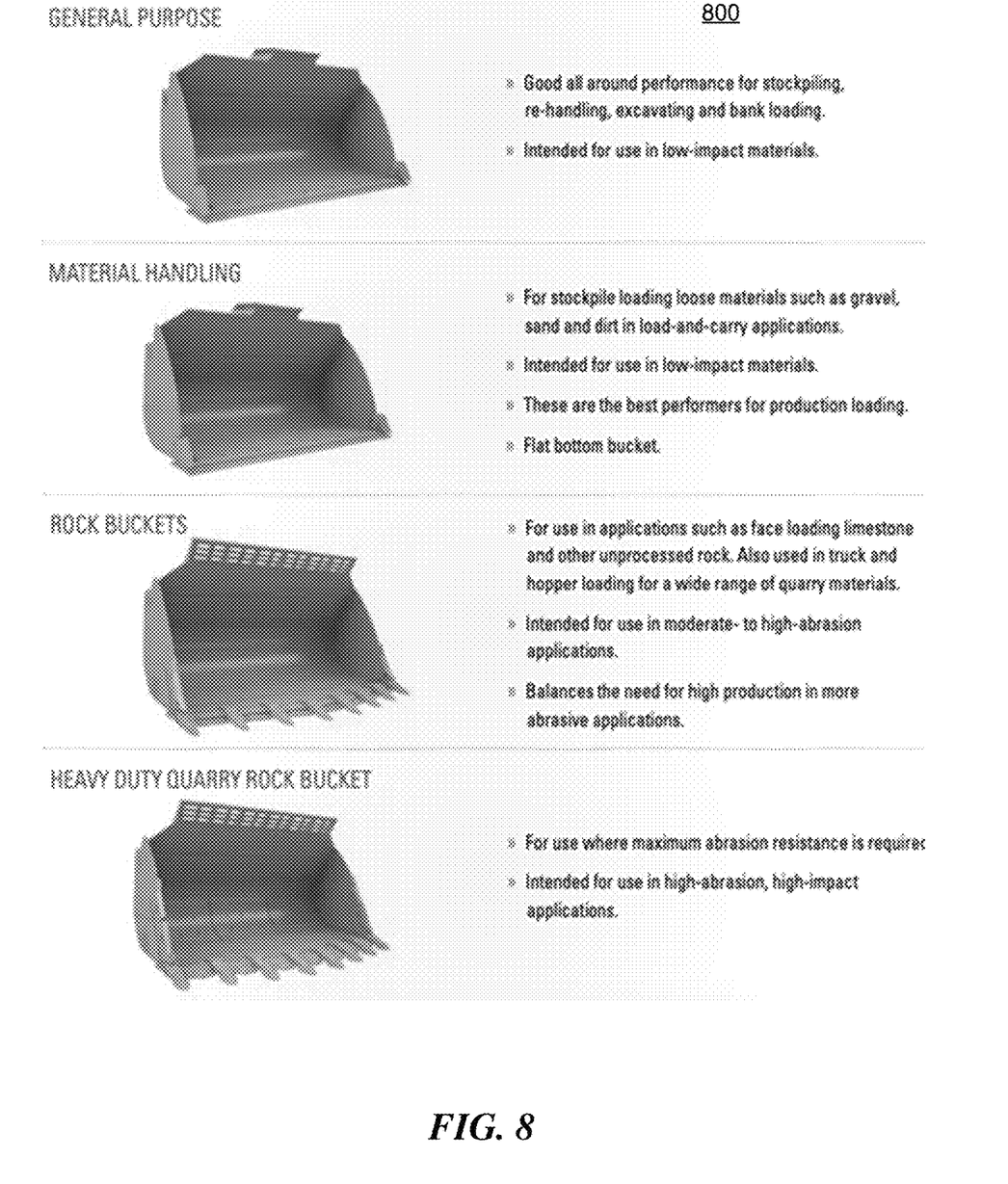
FIG. 8 is a chart a bucket application guide according to embodiments of the disclosed technology.

With reference to FIGS. 7 and 8, in some embodiments, the plurality of machine modifications, e.g., autonomous features and/or implements, can be selected using look up tables or guides based on the determined activity type. For example, FIG. 7 illustrates an autonomous feature table 700 organized by machine configuration and application or activity type. FIG. 8 illustrates a bucket attachment guide 800 organized by activity type and material density.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
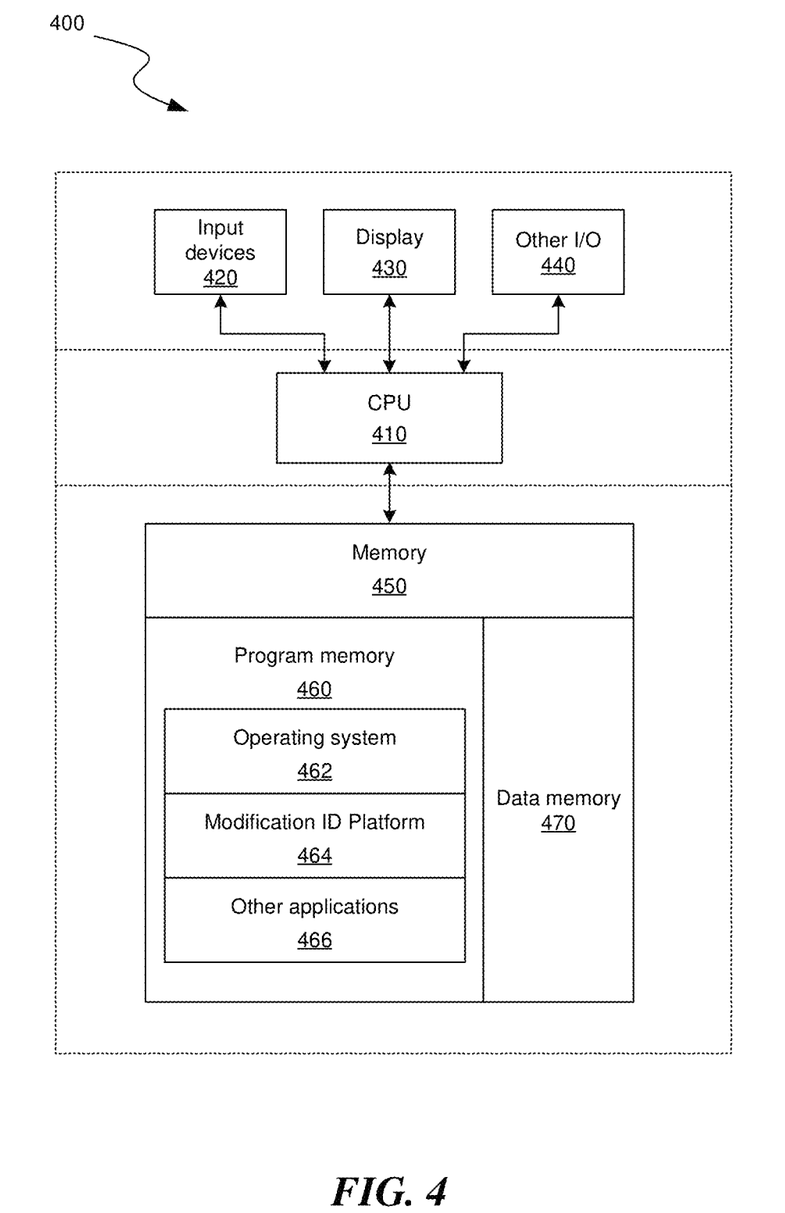
FIG. 4 is a block diagram illustrating an overview of devices on which some implementations can operate.

Several implementations are discussed below in more detail in reference to the figures. FIG. 4 is a block diagram illustrating an overview of devices on which some implementations of the disclosed technology can operate. The devices can comprise hardware components of a device 400 that identifies machine modifications for improved productivity, for example. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, modification identification platform 464, and other application programs 466. Memory 450 can also include data memory 470 that can include database information, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 5:
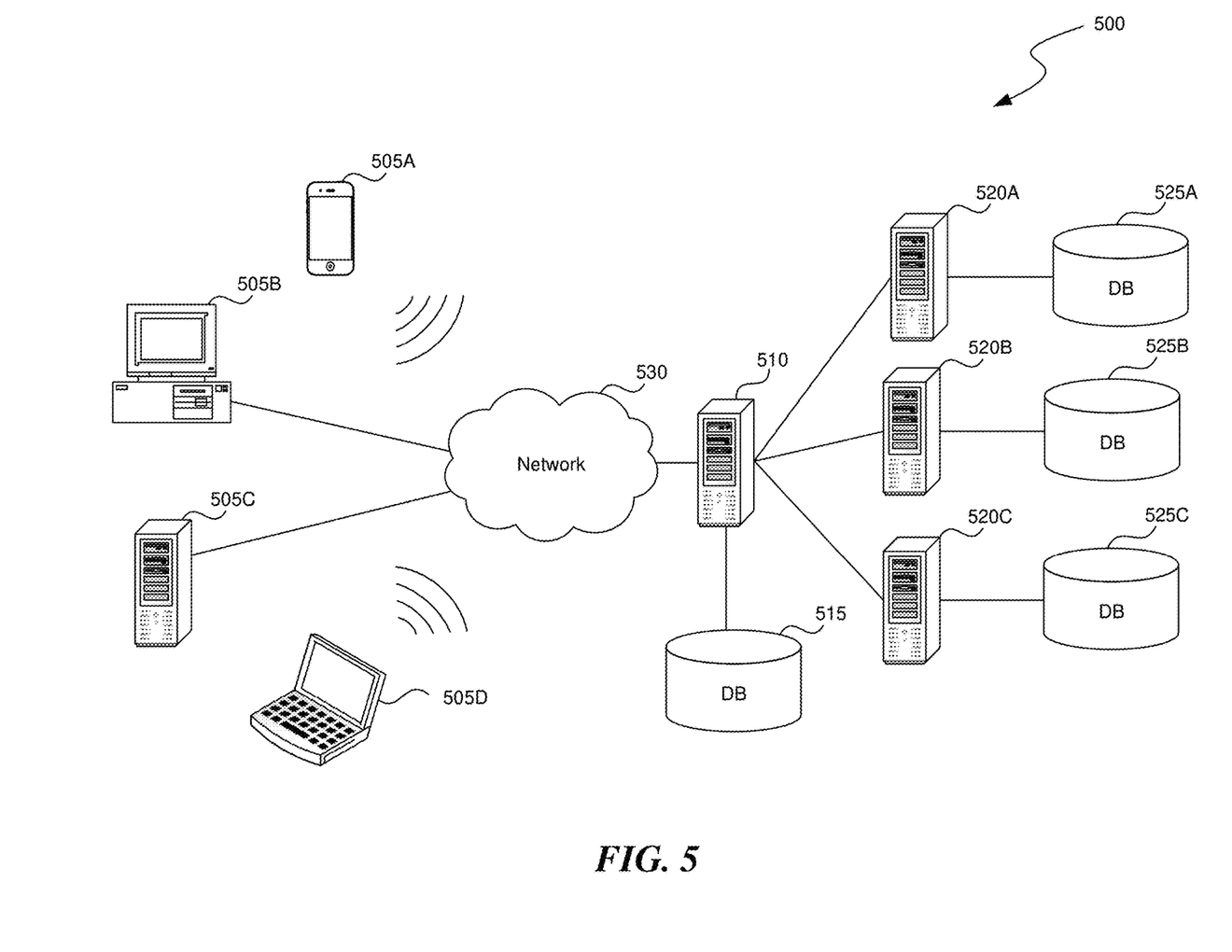
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
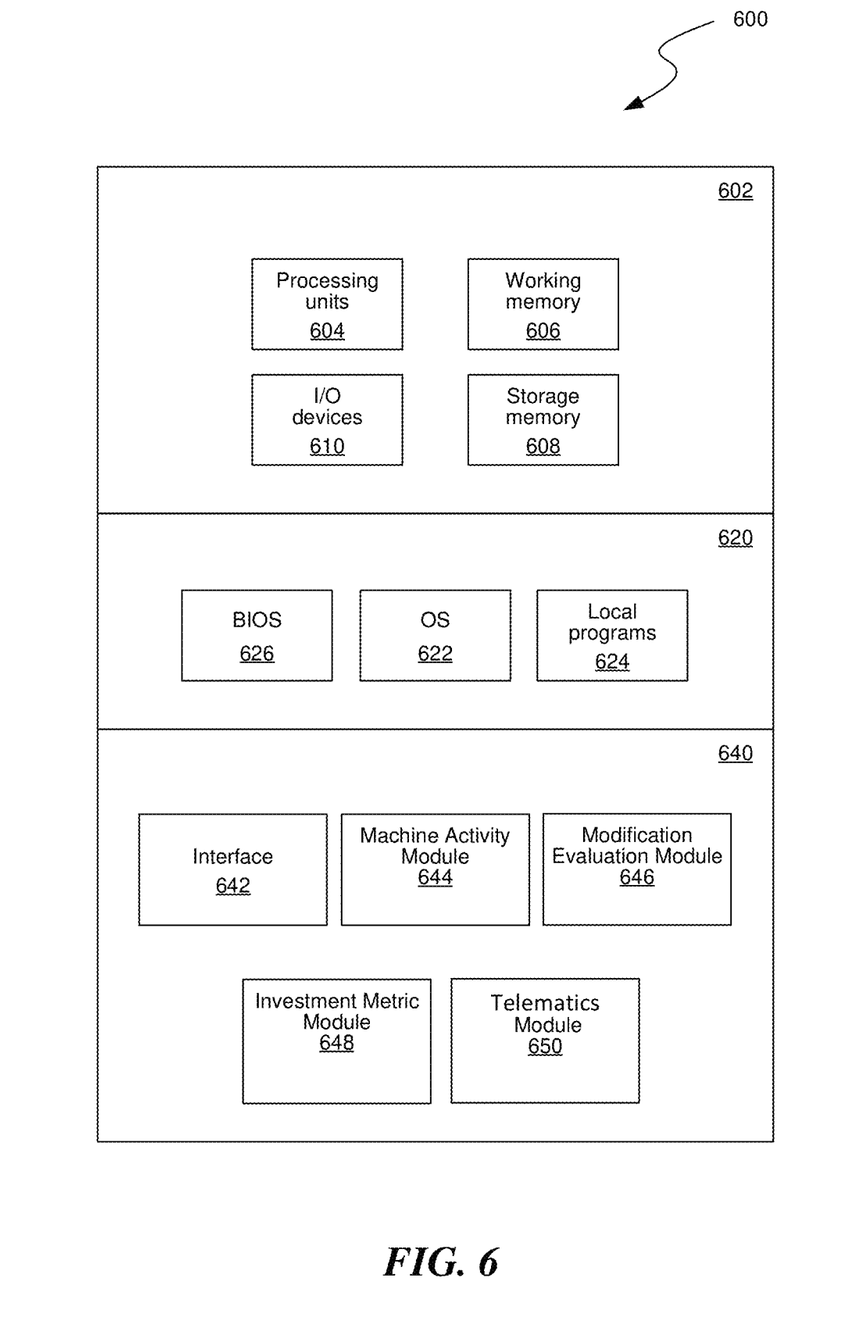
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Components 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624. Specialized components 640 can include a Machine Activity Module 644, a Modification Evaluation Module 646, an Investment Metric Module 648, a Telematics Module 650, and components that can be used for transferring data and controlling the specialized components, such as Interface 642. In some implementations, components 600 can be in a computing system that is distributed across multiple computing devices or can be an interface to a server-based application executing one or more of specialized components 640.

Those skilled in the art will appreciate that the components illustrated in FIGS. 4-6 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, system for identifying machine modifications to improve machine productivity can include a Machine Activity Module 644, a Modification Evaluation Module 646, an Investment Metric Module 648, and a Telematics Module 650 (FIG. 6). In operation, the Machine Activity Module 644 can receive telematics data from the Telematics Module 650 which gathers data from a plurality of sensors 22, 24, and 26 disposed on a machine 20(1), such as an excavator. The Machine Activity Module 644 can determine an activity type (e.g., mass excavation, dirt moving, trenching, scraping, grading, loading, and/or tracking) based on the telematics data using a machine learning model. In some embodiments, module 644 can also calculate a current estimated machine productivity (e.g., yards/hour) for the activity type.

The Modification Evaluation Module 646 can calculate a predicted machine productivity for the activity type for each of a plurality of machine modifications, such as changing an attachments and activating autonomous features.

The Investment Metric Module 648 can compare the predicted machine productivity for each of the plurality of machine modifications with the current estimated productivity. For each modification having a predicted machine productivity greater than the current estimated productivity, the Investment Metric Module 648 calculates an investment metric, such as a payback period or a return on investment. The Investment Metric Module 648 can output a list of each investment metric and its corresponding machine modification to a website or mobile device, for example. In some embodiments, the recommended machine modifications can be ranked by payback period, return on investment, cost to implement, dollar savings over time, and/or any other suitable investment metric.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for identifying machine modifications to improve productivity of an industrial machine, comprising:
   causing a plurality of sensors on the industrial machine performing an activity to provide telematics data to a computing system,
      wherein the telematics data includes at least vibration sensor data and intensity-of-use data;
   determining, by at least one processor of the computing system, a first activity type based on the telematics data;
   calculating, by the at least one processor of the computing system, a current estimated industrial machine productivity for the first activity type;
   executing, by at least one processor of the computing system, a machine learning model to generate a prediction for an activity type pattern that includes the determined first activity type corresponding to a predicted first utilization statistic and a predicted second activity type corresponding to a predicted second utilization statistic of the industrial machine;
   calculating, by the at least one processor of the computing system, a predicted industrial machine productivity for the predicted activity type pattern for each of a plurality of industrial machine modifications,
      wherein the industrial machine modifications relate to configuring the industrial machine for the predicted activity type pattern, the predicted activity type pattern comprising two or more of: loading, excavation, grading, stockpiling, or tracking;
   comparing, by the at least one processor of the computing system, the predicted industrial machine productivity for each of the plurality of industrial machine modifications with the current estimated productivity;
   calculating, by the at least one processor of the computing system, an investment metric for each of the industrial machine modifications having a predicted industrial machine productivity greater than the current estimated productivity;
   outputting, by the at least one processor of the computing system, a set of investment metrics and corresponding industrial machine modifications;
   causing the industrial machine to operate a particular attachment selected based on a particular industrial machine modification from the set.

2. The method of claim 1, wherein calculating, by the at least one processor of the computing system, the current estimated industrial machine productivity for the first activity type is based at least in part on a payload inference model.

3. The method of claim 1, wherein the plurality of industrial machine modifications include replacing the attachment and activating autonomous features.

4. The method of claim 1, wherein calculating, by the at least one processor of the computing system, the predicted machine productivity for each of the plurality of industrial machine modifications is based on a physics based model.

5. The method of claim 1, wherein the computing system comprises a mobile device, the method further comprising providing, by the at least one processor of the computing system, each investment metric and its corresponding machine modification to the mobile device, wherein the mobile device displays the each investment metric and its corresponding modification.

6. The method of claim 1, wherein calculating, by the at least one processor of the computing system, the investment metric comprises calculating at least one of a payback period or a return on investment.

7. The method of claim 1, wherein the particular attachment is optimized for material of a particular density and includes at least one of a general-purpose bucket or a toothed bucket.

8. The method of claim 1, further comprising activating an autonomous feature based on the predicted activity type pattern, wherein the autonomous feature relates to operating the attachment and includes at least one of an electronic fence, a grade assist feature, a bucket assist feature, a boom assist feature, a lift assist feature, and a payload assist feature.

9. A system for identifying machine modifications to improve machine productivity of an industrial machine, comprising:
- at least one vibration sensor communicatively coupled to the industrial machine;
- an attachment to the industrial machine;
- at least one processor; and
- one or more memory devices having stored thereon instructions that when executed by the one or more processors cause the one or more processors to:
  - cause the at least one vibration sensor on the industrial machine performing an activity to capture telematics data;
  - determine, by the at least one processor, a first activity type based on the telematics data;
  - calculate, by the at least one processor, a current estimated industrial machine productivity for the first activity type;
  - execute, by at least one processor, a machine learning model to generate a prediction for an activity type pattern that includes the determined first activity type corresponding to a predicted first utilization statistic and a predicted second activity type corresponding to a predicted second utilization statistic of the industrial machine;
  - calculate, by at least one processor, a predicted industrial machine productivity for the predicted activity type pattern for each of a plurality of industrial machine modifications,
    - wherein the industrial machine modifications relate to configuring the industrial machine for the predicted activity type pattern, the predicted activity type pattern comprising two or more of: loading, excavation, grading, stockpiling, or tracking;
  - compare, by at least one processor, the predicted machine productivity for each of the plurality of industrial machine modifications with the current estimated productivity;
  - calculate, by at least one processor, an investment metric for each of the industrial machine modifications having a predicted industrial machine productivity greater than the current estimated productivity;
  - output, by at least one processor, a set of investment metrics and corresponding industrial machine modifications; and
  - cause the industrial machine to operate the attachment based on a particular industrial machine modification from the set.

10. The system of claim 9, wherein calculating, by the at least one processor, the current estimated industrial machine productivity for the first activity type is based at least in part on a payload inference model.

11. The system of claim 9, wherein the plurality of industrial machine modifications include replacing the attachment to the industrial machine and activating one or more autonomous features based on the predicted activity type pattern, wherein the one or more autonomous features relate to operating the attachment to the industrial machine and include at least one of an electronic fence, a grade assist feature, a bucket assist feature, a boom assist feature, a lift assist feature, and a payload assist feature.

12. The system of claim 9, wherein calculating, by the at least one processor, the predicted machine productivity for each of the plurality of industrial machine modifications is based on a physics based model.

13. The system of claim 9, wherein each investment metric and its corresponding machine modification are displayed on a mobile device.

14. The system of claim 9, wherein calculating, by the at least one processor, the investment metric comprises calculating at least one of a payback period or a return on investment.

15. The system of claim 9, further comprising an additional plurality of sensors on the machine.

16. The system of claim 9, wherein the telematics data from the plurality of sensors is received, by a computing system comprising the at least one processor, via a satellite network.

17. One or more non-transitory computer-readable media storing computer-executable instructions that, when executed by at least one processor, cause the at least one processor to perform operations comprising:
- causing a plurality of sensors on an industrial machine performing an activity to provide telematics data to a computing system,
  - wherein the telematics data includes at least vibration sensor data and intensity-of-use data;
- determining, by at least one processor, a first activity type based on the telematics data;
- calculating, by the at least one processor, a current estimated industrial machine productivity for the first activity type;
- executing, by at least one processor, a machine learning model to generate a prediction for an activity type pattern that includes the determined first activity type corresponding to a predicted first utilization statistic and a predicted second activity type corresponding to a predicted second utilization statistic of the industrial machine;
- calculating, by the at least one processor, a predicted industrial machine productivity for the predicted activity type pattern for each of a plurality of industrial machine modifications,
  - wherein the industrial machine modifications relate to configuring the industrial machine for the predicted activity type pattern, the predicted activity type pattern comprising two or more of: loading, excavation, grading, stockpiling, or tracking;
- comparing, by the at least one processor, the predicted industrial machine productivity for each of the plurality of industrial machine modifications with the current estimated productivity;
- calculating, by the at least one processor, an investment metric for each of the industrial machine modifications having a predicted industrial machine productivity greater than the current estimated productivity;
- outputting, by the at least one processor, a set of investment metrics and corresponding industrial machine modifications;
- causing the industrial machine to operate a particular attachment selected based on a particular industrial machine modification from the set, wherein the particular attachment is optimized for a material of particular density.

18. The one or more non-transitory computer-readable media of claim 17, wherein calculating, by the at least one processor, the current estimated industrial machine productivity for the first activity type is based at least in part on a payload inference model.

19. The one or more non-transitory computer-readable media of claim 17, wherein the plurality of industrial machine modifications include replacing the attachment and activating autonomous features.

20. The one or more non-transitory computer-readable media of claim 17, wherein calculating, by the at least one processor, the predicted machine productivity for each of the plurality of industrial machine modifications is based on a physics based model.

21. The one or more non-transitory computer-readable media of claim 17, wherein each investment metric and its corresponding machine modification are displayed on a mobile device.

22. The one or more non-transitory computer-readable media of claim 17, wherein calculating, by the at least one processor, the investment metric comprises calculating at least one of a payback period or a return on investment.

* * * * *